United States Patent [19]

Nakao et al.

[11] 3,884,759

[45] May 20, 1975

[54] METHOD FOR PRODUCING ERGOSTEROL AND ITS ESTERS

[75] Inventors: Yoshio Nakao; Mitsuzo Kuno, both of Osaka; Masaru Suzuki, Hyogo, all of Japan

[73] Assignee: Takeda Chemical Industries, Ltd., Osaka, Japan

[22] Filed: Jan. 19, 1973

[21] Appl. No.: 325,116

[30] Foreign Application Priority Data
Jan. 28, 1972  Japan.............................. 47-10765

[52] U.S. Cl.............. 195/28 R; 195/81; 195/DIG. 9
[51] Int. Cl............................................. C12d 5/00
[58] Field of Search......... 195/28 R, 27, 49, DIG. 9, 195/81; 260/397.25

[56] References Cited
OTHER PUBLICATIONS

Fawns "Food Production by Microorganisms" Food manufacture November 1944 pp 395–400.

Line et al. "Formation of Organic Acids & Esgsoteral from n-alkanes by fungi isolated from oil fields in Japan" Cited in Chem. Abst. 75:139,3953.

Appleton et al. Steral Content of Fungi II Screening of Representative Yeasts and Molds for Sterol Content Applied Microbiology 3, 1955 pp. 249–257.

*Primary Examiner*—A. Louis Monacell
*Assistant Examiner*—R. B. Penland
*Attorney, Agent, or Firm*—Wenderoth, Lind & Ponack

[57] ABSTRACT

Ergosterol and its esters are produced by culturing a microorganism capable of accumulating ergosterol or its esters extracellularly belonging to the genus Trichoderma, the genus Fusarium or the genus Cephalosporium in a culture medium, causing the microorganisms to accumulate ergosterol or its esters extracellularly in the culture broth and recovering the ergosterol as its free form or its esters from the culture broth.

16 Claims, No Drawings

METHOD FOR PRODUCING ERGOSTEROL AND ITS ESTERS

This invention relates to a method for the production of ergosterol and its esters by cultivating a microorganism capable of accumulating ergosterol or its esters extracellularly belonging to the genus *Trichoderma*, the genus *Fusarium* or the genus *Cephalosporium*.

Ergosterol and its esters have been important as a starting compound for the synthesis of Vitamin D and as a precursor for the preparation of synthetic steroid hormones and they have been in a great demand.

Ergosterol has been known as a constituent of the cells of molds and yeasts, and has been obtained by cultivating *Saccharomyces cerevisiae*, causing the microorganism to accumulate ergosterol intracellularly and extracting it from the cells. However, content of ergosterol in the cells is not too large, because ergosterol, as a constituent of the cells, is controlled by the metabolic system of the cells. Therefore the said known method has a limit in increasing the production amount. And such a cell-extraction process is rather troublesome and leads to a high production cost. It has been desired to develop a novel process for the production of ergosterol more advantageously and economically.

This invention provides an industrially advantageous method for producing ergosterol and its esters by cultivating the microorganism capable of accumulating ergosterol or its esters extracellularly belonging to the genus Trichoderma, the genus Fusarium or the genus Cephalosporium in a culture medium, accumulating the ergosterol or its esters in the culture broth and recovering ergosterol as its free form or its esters from the culture broth.

The microorganisms employed in this invention can accumulate ergosterol or its esters extracellularly. The present method provides a high production yield of ergosterol or its esters because of a large amount of the end-products accumulated extracellularly and easy purification procedure of these compounds.

The microorganisms used in this invention belong to the genus Trichoderma, the genus Fusarium or the genus Cephalosporium. More concretely the microorganisms which belong to the species *Trichoderma sp.* in which the strain *Trichoderma sp.* IFO 6355 is included, the species *Trichoderma viride*, the species *Fusarium sp.* in which *Fusarium sp.* IFO 8884 (ATCC 20192) is included, the species *Fusarium oxysporum*, the species *Fusarium roseum*, the species *Cephalosporium coremioides* or the species *Cephalosporium sclerotigenum* are used.

The typical examples of the microorganisms used in this invention are *Trichoderma sp.* IFO 6355, *Trichoderma viride* IFO 9066, *Fusarium sp.*S-19-5 IFO 8884(ATCC 20192), *Fusarium oxysporum* IFO 4471, *Fusarium roseum* IFO 7189, *Cephalosporium coremioides* IFO 8579, and *Cephalosporium sclerotigenum* IFO 8385. Their mutants and variants, which have an ability of accumulating ergosterol or its esters, induced by treating the above-mentioned microorganisms with irradiation of ultraviolet ray, X-ray or γ-ray or with a chemical agent such as sodium nitrite, N-methyl-N'-nitro-N-nitrosoguanidine.

The afore-mentioned typical examples of microorganisms are deposited and opened to public at Institute for Fermentation, Osaka, Japan and at American Type Culture Collection, Maryland, USA under the numbers of IFO- and ATCC-, respectively.

As to the esters of ergosterol, various kinds of esters of fatty acids may be produced solely or concomitantly with free ergosterol through the cultivation of the microorganism used. The said fatty acid esters are exemplified by those with fatty acids having from 2 to 19 carbon atoms. The typical examples of those are lower fatty acid such as acetic acid and higher fatty acid having 14 to 18 carbon atoms such as palmitic acid, stearic acid and oleic acid.

By the addition of the preferable fatty acid or its derivatives such as esters in the culture broth, various kinds of fatty acid esters of ergosterol can be prepared.

Further, when such fatty acids as described above has been added to the culture medium, the produced ergosterol may be able to recover in the form of the corresponding fatty acid ester.

The cultivation of the microorganism may be effected either on a solid or a liquid medium, but it is recommended industrially to employ a liquid medium. When the liquid medium is employed, the cultivation may be conducted under shaking or under aeration with agitation.

The culture medium to be employed in this invention contains assimilable carbon sources, digestible nitrogen sources, inorganic salts and growth factors.

As the carbon sources use are made of, for example, hydrocarbons such as normal paraffin, especially with 10 to 20 carbon atoms (e.g. decane, undecane, dodecane, tridecane, tetradecane, pentadecane, hexadecane, heptadecane, octadecane, nonadecane and eicosane) and their mixtures, saccharides (e.g. glucose, sucrose, starch, soluble-starch, blackstrap molasses, xylose and galactose), glycerol, inositol, mannitol, millet jelly, sorbitol, dextrin, acetic acid, methanol, ethanol, etc. The hydrocarbons, especially n-paraffins, may be employed in the medium as the most suitable carbon sources for the great amount of accumulation of ergosterol or its esters in the medium.

As the nitrogen sources, use are made of, for example, ingredients or extracts of animals (e.g. peptone, meat extract, casein), ingredients or extracts of plants [e.g. cornsteep liquor, defatted soybean powder, dry yeast, yeast extract, protein hydrolyzates (e.g. enzymatical hydrolyzate of soybean protein or casein hydrolyzate), soybean flour, cottonseed meal, rice bran, wheat bran, etc], ammonium salts of organic acids (e.g. ammonium succinate, ammonium tartrate, ammonium acetate), inorganic nitrogen compounds (e.g. ammonium chloride, ammonium sulfate, ammonium phosphate) and organic nitrogen compounds (e.g. urea).

As the inorganic salts, use are made of, for example, phosphoric acid salts, metal salts (e.g. potassium salt, magnesium salt or calcium salt).

As the growth factors, use are made of, for example, vitamins such as biotin or thiamine.

The conditions of cultivation, i.e. pH of the medium, cultivation temperature and cultivation period, are adequately employed for the microorganism to accumulate ergosterol or its esters in the maximum. For example, in case of shaking or submerged culture, the cultivation is advantageously carried out at a temperature ranging from 15° to 45°C, preferably 20° to 38°C, at a pH of 2–9, preferably 4–8 and for 10–360 hours, preferably 72–192 hours.

The separation and purification of thus accumulated ergosterol and its esters are carried out by a per se conventional manner. For example, the culture broth is extracted with an organic solvent such as n-hexane, cyclohexane, benzene, ethyl acetate, butyl acetate and chloroform. The extraction may be carried out after eliminating the mycelia, if desired. The products are transferred to the organic solvent by the said extraction procedure, and then the organic solvent layer is collected and concentrated under reduced pressure, whereby a residue of brown syrup is obtained. The residue is dissolved in chloroform and the solution is passed over a column filled with silica gel or alumina by using chloroform, petroleum ether or petroleum benzine as a developer to elute. Portions which show a strong absorption at 283 m$\mu$ are collected.

The thus collected portions are dissolved in a solvent such as hexane and ethanol and kept standing at a cold room, whereby the desired product is obtained as crystals.

For further explanation of the present invention, the following examples are given, wherein "part(s)" is based on weight unless otherwise noted and the relationship between "part(s)" and "part(s) by volume" corresponds to that between "gram(s)" and "milliliter(s)".

EXAMPLE 1

A culture of *Fusarium sp.* S-19-5 (IFO 8884, ATCC 20192) is inoculated on a slant (pH 6.5) containing 1% of malt extract, 1% of glucose, 1% of polypeptone and 2% of agar and cultivated for 168 hours.

Fifty parts by volume of a seed-culture medium (pH 6.5) containing 2% of glucose, 2% of soybean powder, 0.1% of $KH_2PO_4$ and 0.5% of soybean oil is poured into a fermenter of 300 parts by volume in capacity. After sterilization at 120°C for 20 minutes, the medium is inoculated with mycelia growing as the said slant and is then kept at 24°C for 48 hours to prepare a seed-culture.

One thousand parts by volume of a fermentation medium (pH 6.5) containing 13% of n-paraffin (a mixture of decane, undecane, dodecane and tridecane), 7% of polypeptone S (made by Daigo Nutritive Chemicals, Ltd.), 0.8% of $KH_2PO_4$, 0.2% of $K_2HPO_4$, 0.1% of $FeSO_4 \cdot 7H_2O$, 0.05% of $MgSO_4 \cdot 7H_2O$, 0.01% of $CaCl_2 \cdot 2H_2O$, 0.5% of soybean oil, 0.5% of Tween 60 and 1% of $CaCO_3$ is poured into a fermenter of 3,000 parts by volume in capacity. After sterilization at 120°C for 20 minutes, the medium is inoculated with 50 parts by volume of the said seed-culture and is then cultivated at 24°C for 90 hours.

The thus obtained culture broth is subjected to centrifugation to eliminate the mycelia. The culture liquid is extracted with one-half volume of cyclohexane three times. The cyclohexane layers are collected and dried by treating with sodium sulfate and then concentrated under reduced pressure. The thus obtained concentrate is dissolved in chloroform. The chloroform solution is passed over a column packed with silica gel made by Merck & Co., Inc. for chromatography using petroleum ether as a developer. Among the petroleum ether fractions, those showing a strong absorption at 283 m$\mu$, are collected and concentrated. The residue is dissolved in ethanol and kept standing at a cold room for 2 days. The precipitating crude colorless fine needles are recovered by filtration and recrystallized from ethanol, whereby 0.650 part by weight of ergosteryl palmitate is obtained as colorless plates.

The crystals show a melting point of 108°C, $[\alpha]_D^{22} = -58°$ of optical rotation measured in a chloroform solution. The physicochemical properties are well identical with those cited in a literature reference (e.g. Journal of the Pharmaceutical Society of Japan 83, 107(1962)). The product has carbon, hydrogen and oxygen atoms. Elementary analysis shows C 82.8%, H 11.6%. The molecular weight is measured to be 635 by mass spectrometry. The infrared absorption spectrum is completely identical with that published in a literature reference.

The mother liquor obtained by eliminating the said crystals of ergosteryl palmitate by filtration is concentrated and dissolved in chloroform. The chloroform solution is passed over a column packed with silica gel using chloroform to elute.

The portions following the elution of ergosteryl palmitate are collected and concentrated, whereby 0.2 part by weight of ergosterol is obtained as yellow powder. Physico-chemical properties of the product are well identical with those of an authentic sample of ergosterol.

EXAMPLE 2

A culture of *Trichoderma sp.* IFO 6355 is inoculated on a slant containing 1% of malt extract, 1% of glucose, 1% of polypeptone and 2% of agar and incubated at 2420C for 168 hours.

Fifty parts by volume of seed-culture medium (pH 6.5) containing 2% of glucose, 2% of soybean powder, 0.1% of $KH_2PO_4$ and 0.5% of soybean oil is poured into a fermenter of 300 parts by volume in capacity. After sterilization at 120°C for 20 minutes, the medium is inoculated with mycelia of the said slant culture, which is then kept at 24°C for 48 hours to give a seed-culture.

Twenty parts by volume each of the medium separated from 1,000 parts by volume of fermentation medium (pH 6.5) containing 13% of n-paraffin (a mixture of decane, undecane, dodecane and tridecane), 7% of polypeptone S (made by Daigo Nutritive Chemicals, Ltd.), 0.8% of $KH_2PO_4$, 0.2% of $K_2HPO_4$, 0.1% of $FeSO_4 \cdot 7H_2O$, 0.05% of $MgSO_4 \cdot 7H_2O$, 0.01% of $CaCl_2 \cdot 2H_2O$, 0.5% of soybean oil, 0.5% of Tween 60 and 1% of $CaCO_3$ (sterilized separately) is poured into 50 fermenters each having a capacity of 200 parts by volume. After sterilization at 120°C for 20 minutes, each medium is inoculated with 1 part by volume of the said seed-culture and is then cultivated at 24°C for 90 hours. After the cultivation, all the culture broths are collected and the mycelia are eliminated by centrifugation. The culture liquid is extracted three times with one-half volume of n-hexane. The n-hexane layer is dried with sodium sulfate and then concentrated under reduced pressure. The concentrate is dissolved in chloroform and chromatographed by passing a column packed with silica gel (made by Merck & Co., Inc.).

Eluate portions which show high absorbancy at 283 m$\mu$ are collected, concentrated and dissolved in n-hexane and kept standing at cold room for two days. The precipitating colorless fine needles are recovered by filtration and recrystallized from ethanol, whereby 0.56 part by weight of ergosteryl palmitate is obtained as colorless plates.

The mother liquor obtained by eliminating said crude crystals of ergosteryl palmitate by filtration is concentrated and dissolved in chloroform. The chloroform solution is applied to silica gel column chromatography. The portions following the elution of ergosteryl palmitate are collected and concentrated, whereby 0.15 part by weight of ergosterol is obtained as yellow powder. Physico-chemical properties of the product are identical with those of an authentic sample of ergosterol.

EXAMPLE 3

One thousand parts by volume of fermentation medium (pH 6.5) containing 13% of n-paraffin (a mixture of tetradecane, pentadecane and hexadecane), 7% of polypeptone S (made by Daigo Nutritive Chemicals, Ltd.), 0.8% of $KH_2PO_4$, 0.2% of $K_2HPO_4$, 0.1% of $FeSO_4 \cdot 7H_2O$, 0.05% of $MgSO_4 \cdot 7H_2O$, 0.01% of $CaCl_2 \cdot 2H_2O$, 0.5% of soybean oil, 0.5% of Tween 60 and 1% of $CaCO_3$ (sterilized separately) is poured into a fermenter of 3,000 parts by volume in capacity. After sterilizing at 120°C for 20 minutes, the medium is inoculated with 50 parts by volume of the seed-culture of *Fusarium sp.* S-19-5 (IFO 8884, ATCC 20192) obtained by Example 1.

The inoculated medium is cultivated and subjected to purification procedure in the same manner as Example 1, whereby 0.58 part by weight of ergosteryl palmitate and 0.18 part by weight of ergosterol are obtained.

EXAMPLE 4

*Fusarium oxysporum* IFO 4471 is employed in the same manner and conditions as Example 2, whereby 0.3 part by weight of ergosteryl palmitate and 0.15 part by weight of ergosterol are obtained from 1000 parts by volume of the culture broth.

EXAMPLE 5

One thousand parts by volume of fermentation medium (pH 6.5) containing 5% of sucrose, 7% of polypeptone S, 0.8% of $KH_2PO_4$, 0.2% of $K_2HPO_4$, 0.1% of $FeSO_4 \cdot 7H_2O$, 0.05% of $MgSO_4 \cdot 7H_2O$, 0.01% of $CaCl_2 \cdot 2H_2O$, 0.5% of Tween 60, 1% of $CaCO_3$ and 5% of n-paraffin (a mixture of decane, undecane, dodecane and tridecane) is inoculated with a seed-culture of *Cephalosporium coremioides* IFO 8579 in the same manner as Example 2 and cultivated for 90 hours. The culture broth is treated in the same manner as Example 2, whereby 0.52 part by weight of ergosteryl palmitate and 0.23 part by weight of ergosterol are obtained.

EXAMPLE 6

One thousand parts by volume of fermentation medium pH 6.5) containing 13% of n-paraffin (a mixture of heptadecane, octadecane, nonadecane and eicosane), 7% of polypeptone S (made by Daigo Nutritive Chemicals, Ltd.), 0.8% of $KH_2PO_4$, 0.2% of $K_2HPO_4$, 0.1% of $FeSO_4 \cdot 7H_2O$, 0.05% of $MgSO_4 \cdot 7H_2O$, 0.01% of $CaCl_2 \cdot 2H_2O$, 0.5% of soybean oil, 0.5% of Tween 60 and 1% of $CaCO_3$ (sterilized separately) is poured into a fermenter of 3,000 parts by volume in capacity. After sterilizing at 120°C for 20 minutes, the medium is inoculated with 50 parts by volume of the seed-culture of *Fusarium sp.* S-19-5 (IFO 8884, ATCC 20192) obtained by Example 1.

The inoculated medium is cultivated and subjected to purification procedure in the same manner as Example 1, whereby 0.51 part by weight of ergosteryl palmitate and 0.15 part by weight of ergosterol are obtained.

What we claim is:

1. A method for producing ergosterol, its esters or a mixture thereof which comprises inoculating a microorganism capable of accumulating ergosterol, its esters or a mixture thereof extracellularly belonging to the genus Trichoderma, the genus Fusarium or the genus Cephalosporium in a culture medium; cultivating the culture until ergosterol, its esters or a mixture thereof is accumulated extracellularly; and recovering ergosterol, its esters or a mixture thereof from the culture broth.

2. A method as claimed in claim 1, wherein the medium contains n-parrafin having from 10 to 20 carbon atoms as a carbon source.

3. A method as claimed in claim 1, wherein the microorganism is *Trichoderma viride*.

4. A method as claimed in claim 1, wherein the microorganism is *Fusarium oxysporum*.

5. A method as claimed in claim 1, wherein the microorganism is *Fusarium roseum*.

6. A method as claimed in claim 1, wherein the microorganism is *Cephalosporium coremioides*.

7. A method as claimed in claim 1, wherein the microorganism is *Cephalosporium sclerotigenum*.

8. A method as claimed in claim 1, wherein the microorganism is *Trichoderma sp.* IFO-6355.

9. A method as claimed in claim 1, wherein the microorganism is *Fusarium sp.* S-19-5 IFO-8884.

10. A method as claimed in claim 3, wherein the microorganism is *Trichoderma viride* IFO-9066.

11. A method as claimed in claim 4, wherein the microorganism is *Fusarium oxysporum* IFO-4471.

12. A method as claimed in claim 5, wherein the microorganism is *Fusarium roseum* IFO-7189.

13. A method as claimed in claim 6, wherein the microorganism is *Cephalosporium coremioides* IFO-8579.

14. A method as claimed in claim 7, wherein the microorganism is *Cephalosporium sclerotigenum* IFO-8385.

15. A method as claimed in claim 1 wherein ergosterol is produced in free from.

16. A method as claimed in claim 1 wherein a fatty acid having 2 to 19 carbon atoms is added to the culture medium to produce the corresponding ester of ergosterol or mixtures of ergosterol and the corresponding fatty acid ester thereof.

* * * * *